US010423055B2

(12) United States Patent
Fujita et al.

(10) Patent No.: US 10,423,055 B2
(45) Date of Patent: Sep. 24, 2019

(54) ILLUMINATION DEVICE AND IMAGE PROJECTION APPARATUS

(71) Applicants: Kazuhiro Fujita, Tokyo (JP); Takahiro Kado, Kanagawa (JP)

(72) Inventors: Kazuhiro Fujita, Tokyo (JP); Takahiro Kado, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/547,901

(22) PCT Filed: Feb. 9, 2016

(86) PCT No.: PCT/JP2016/000652
§ 371 (c)(1),
(2) Date: Aug. 1, 2017

(87) PCT Pub. No.: WO2016/132706
PCT Pub. Date: Aug. 25, 2016

(65) Prior Publication Data
US 2018/0024425 A1    Jan. 25, 2018

(30) Foreign Application Priority Data

Feb. 20, 2015 (JP) ................................. 2015-031828
Jun. 16, 2015 (JP) ................................. 2015-120888

(51) Int. Cl.
G03B 21/20 (2006.01)
G03B 21/16 (2006.01)
H04N 9/31 (2006.01)

(52) U.S. Cl.
CPC ........... *G03B 21/204* (2013.01); *G03B 21/16* (2013.01); *G03B 21/208* (2013.01);
(Continued)

(58) Field of Classification Search
CPC ...................... G03B 21/204; G03B 21/2066
(Continued)

(56) References Cited

U.S. PATENT DOCUMENTS

2007/0165186 A1    7/2007  Copner et al.
2007/0279914 A1*  12/2007  Rutherford .......... G02B 6/0068
                                                   362/341
(Continued)

FOREIGN PATENT DOCUMENTS

JP          2006-214006       8/2006
JP          2007-4200         1/2007
(Continued)

OTHER PUBLICATIONS

Extended European Search Report dated Feb. 13, 2018.
(Continued)

*Primary Examiner* — William N Harris
(74) *Attorney, Agent, or Firm* — Harness, Dickey & Pierce, P.L.C.

(57) ABSTRACT

This invention is concerning an illumination device that can obtain illumination light efficiently. An illumination device 1 used in, for example, a projection display apparatus includes a light source and a light tunnel 14. The light tunnel 14 includes a light incident port 15, a light emission port 16, a light guide path 17, a reflection surface 20 surrounding the light guide path 17, a phosphor layer 19 that generates fluorescent light LF having a different wavelength range from that of excitation light LE when being excited by the excitation light LE, a condensing optical system 13 that diverges the excitation light LE in the vicinity of the light incident port 15 and guides the diverged light into the light tunnel 14 to irradiate the phosphor layer 19, and a wavelength selection element that reflects the fluorescent light LF toward the light emission port 16.

19 Claims, 8 Drawing Sheets

(52) U.S. Cl.
CPC ..... *G03B 21/2013* (2013.01); *G03B 21/2066* (2013.01); *H04N 9/3152* (2013.01)

(58) Field of Classification Search
USPC .......................................................... 362/621
See application file for complete search history.

(56) References Cited

U.S. PATENT DOCUMENTS

| | | | |
|---|---|---|---|
| 2007/0279915 A1* | 12/2007 | Rutherford | G02B 6/0003 362/341 |
| 2008/0232084 A1 | 9/2008 | Kon | |
| 2010/0046234 A1* | 2/2010 | Abu-Ageel | G02B 3/0006 362/308 |
| 2010/0202129 A1* | 8/2010 | Abu-Ageel | C09K 11/7734 362/84 |
| 2012/0019786 A1* | 1/2012 | Kimura | G03B 21/14 353/31 |
| 2012/0044465 A1 | 2/2012 | Murai et al. | |
| 2012/0188518 A1 | 7/2012 | Mukouyama et al. | |
| 2013/0100644 A1* | 4/2013 | Hu | F21V 7/22 362/84 |
| 2013/0114301 A1* | 5/2013 | Um | G02B 6/0023 362/621 |
| 2013/0250546 A1* | 9/2013 | Hu | F21V 9/40 362/84 |
| 2013/0258639 A1* | 10/2013 | Hu | F21V 9/40 362/84 |
| 2014/0028983 A1 | 1/2014 | Fujita et al. | |
| 2014/0071182 A1 | 3/2014 | Takahashi et al. | |
| 2014/0071407 A1 | 3/2014 | Takahashi et al. | |
| 2014/0071408 A1 | 3/2014 | Takahashi et al. | |
| 2014/0240676 A1 | 8/2014 | Maes et al. | |
| 2014/0340649 A1 | 11/2014 | Takahashi et al. | |
| 2015/0167906 A1* | 6/2015 | Tomiyama | G03B 21/204 353/31 |

FOREIGN PATENT DOCUMENTS

| | | |
|---|---|---|
| JP | 2011-203597 | 10/2011 |
| JP | 2011-221260 | 11/2011 |
| JP | 2012-63567 | 3/2012 |
| JP | 2012-69387 | 4/2012 |
| JP | 2012-168507 | 9/2012 |
| JP | 2012-209036 A | 10/2012 |
| JP | 2013-94496 | 5/2013 |
| JP | 2014-10181 | 1/2014 |
| JP | 2014-89462 | 5/2014 |
| JP | 2014-192127 A | 10/2014 |
| JP | 2014-240912 | 12/2014 |
| WO | WO-2012/133485 A1 | 10/2012 |
| WO | WO-2014/156550 A1 | 10/2014 |

OTHER PUBLICATIONS

International Search Report dated Apr. 19, 2016 in PCT/JP2016/000652 filed on Feb. 9, 2016.
Japanese Office Action dated Feb. 5, 2019.

* cited by examiner

ILLUMINATION DEVICE AND IMAGE PROJECTION APPARATUS

TECHNICAL FIELD

The present invention relates to an illumination device and an image projection apparatus.

BACKGROUND ART

A wavelength conversion technique to obtain, for example, green fluorescent light or red fluorescent light by irradiating a phosphor with excitation light having short wavelength (e.g., excitation light emitted from the blue laser) and to utilize the obtained fluorescent light as illumination light has been known. A solid light source such as the blue laser represents a light source device having a good responsiveness. Hence, solid light sources are widely utilized in an image projection apparatus (hereinafter, simply referred to as a projector). The projector then obtains several types of illumination light (e.g., green illumination light) efficiently in accordance with the wavelength conversion technique.

The projector can obtain the illumination light and guide the illumination light onto a display panel of the projector more efficiently when the light source is smaller. Accordingly, most of projectors condense the excitation light before irradiating the phosphor with the excitation light. However, these projectors may not have enough irradiation area to irradiate the phosphor with the excitation light, and, therefore, cannot obtain enough fluorescent light intensity. To overcome such a deficiency, a projector that installs a phosphor on a light guide member, which guides illumination light, has been developed (see Patent Literatures 1 and 2).

Patent Literature 1 discloses a projector that includes a translucent rod (light guide member) containing a phosphor as a light tunnel, allows the excitation light to enter the light tunnel, and outputs fluorescent light generated in the light tunnel in accordance with light-guiding action of the light tunnel.

In the technique of Patent Literature 1, the fluorescent light generated by the phosphor passes through the translucent rod where the phosphor itself is included. However, this decreases the transmittance of the translucent rod and loses the light guided to the emission port. That is, it is difficult to obtain high efficient fluorescent light.

Patent Literature 2 discloses a projector that includes a plurality of optical paths for excitation light, and sequentially irradiates a plurality of phosphors coating the inside of a light tunnel with the excitation light beam so as to obtain fluorescent light having a required wavelength. The fluorescent light generated by the phosphors is repeatedly reflected inside the light tunnel such that the illumination distribution is equalized before the fluorescent light is emitted from an emission port. Therefore, it is possible to guide the fluorescent light to the emission port as illumination light. Similar to the technique of Patent Literature 2, a technique to obtain illumination light efficiently should be developed.

SUMMARY OF INVENTION

Technical Problem

An object of the present invention is, therefore, to provide an illumination device that can obtain illumination light efficiently.

Solution to Problem

To achieve the above object, an aspect of the present invention provides an illumination device that includes a light source that emits light having a predetermined wavelength range, a light incident part to which the light is incident from the light source, a light emission part from which the light is emitted, and a light guide member that includes a light guide path extending from the light incident part to the light emission part. The light guide member includes a wavelength conversion member to convert the light into light having a different wavelength range from the light emitted from the light source, and a wavelength selector to permeate the light emitted from the light source and to reflect the converted light is provided at the light incident part.

Advantageous Effects of Invention

With this, it provides an illumination device that can obtain illumination light efficiently.

DESCRIPTION OF EMBODIMENTS

First Embodiment

Figure 1A:
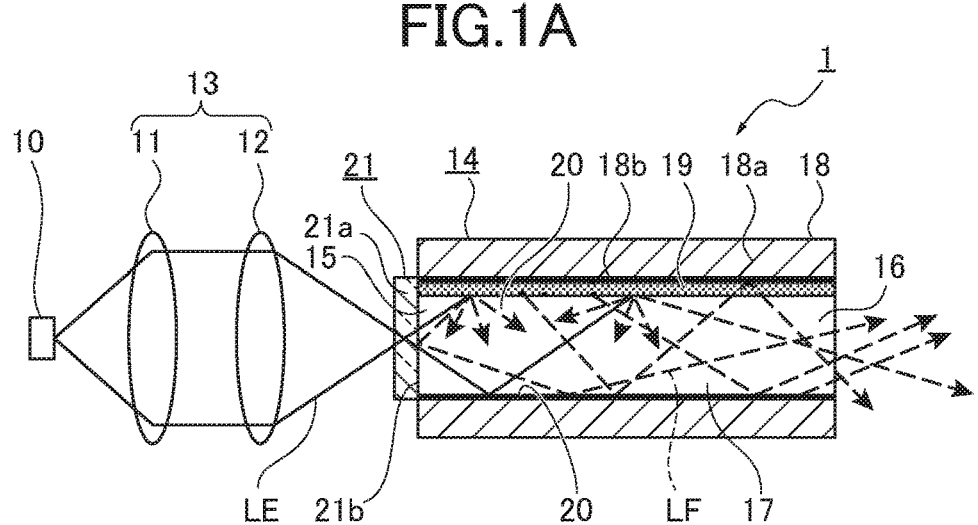
FIG. 1A is a schematic view illustrating an illumination device according to a first embodiment of this disclosure, particularly an optical diagram of the illumination device.
Figure 1B:
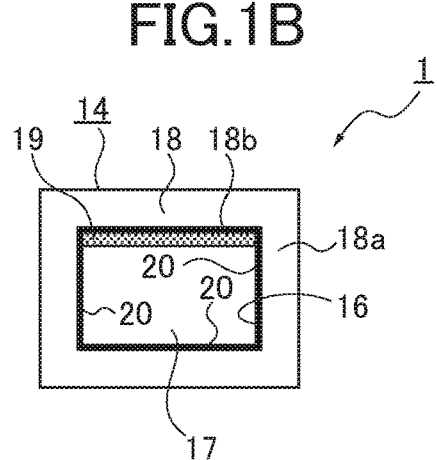
FIG. 1B is a schematic view illustrating the illumination device, particularly a plane view illustrating a light tunnel of the illumination device seen from a light emission port side.

Hereinafter, an embodiment of this disclosure will be explained with reference to the drawings. FIG. 1A is an optical diagram of an illumination device 1, and FIG. 1B is a plane view illustrating a light tunnel 14 of the illumination device 1 seen from the side of a light emission port 16.

As illustrated in FIG. 1A, the illumination device 1 of the first embodiment includes a light source 10 that generates and emits excitation light as an excitation light source, a condensing optical system 13 having condensing elements 11 and 12, a light tunnel 14, and a wavelength selection element 21. The condensing optical system 13 is as an example of an incident part, the light tunnel 14 is an example of a light guide member, and the wavelength selection element 21 is an example of a wavelength selector.

The light source 10 generates and emits light (excitation light) in a blue wavelength range. As the light source 10, a solid light source, particularly a blue laser diode (hereinafter called "blue LD") is used. That is, the light source 10 generates and emits a blue laser beam in the wavelength range of 400 nm to 470 nm as the excitation light LE. Although the light source 10 of the first embodiment is illustrated as a single blue LD in FIG. 1, the configuration of the light source 10 should not be limited thereto. For instance, the light source 10 may be configured with a light emitting array including a plurality of light sources (e.g., blue LDs), and emits the light by condensing the light emitted from the plurality of the light sources 10. Alternatively, the light source 10 may be configured by aligning a plurality of light sources in parallel. Note the above configurations of the light source 10 are applicable in the following embodiments.

Here, the light source 10 should not be limited to the blue LD. For instance, a blue light emitting diode (LED) may be used as the light source 10. Further, an LD or an LED emitting light other than blue color light, an LD emitting light in the ultravioletray range, or a combination thereof may be used as the light source 10.

The condensing optical system 13, which is an example of the incident part (incident optical system), condenses light emitted from the light source 10 and guides the condensed light to the light tunnel 14. Specifically, the condensing element 11 of the condensing optical system 13 condenses excitation light LE emitted from the light source 10 and outputs it as a parallel luminous flux. The excitation light LE being the parallel luminous flux is further condensed by the condensing element 12 and is guided to the light tunnel 14 in a divergent state.

Note that the condensing optical system 13 should not be limited thereto. As long as the condensing optical system is configured to guide the excitation light LE to the light tunnel 14 in the divergent state, the system may be configured with only a single condensing element or may be configured to include a reflection mirror, a diffraction grating, and the like.

The light tunnel 14 includes a light incident port (light incident part) 15, the light emission port (light emission part) 16, and a light guide path 17 extending from the light incident port 15 to the light emission port 16. The inside surfaces of the light tunnel 14 surround the light guide path 17. The light tunnel 14 guides the excitation light LE entering from the light incident port 15 to the light emission port 16 while reflecting the excitation light LE by the inside surfaces. By repeatedly reflecting the light inside the light tunnel 14, the light tunnel 14 equalizes luminance distribution of the light, i.e., eliminates unevenness of light intensity.

As illustrated in FIG. 1A, the light tunnel of the first embodiment has a constant diameter from the light incident port 15 to the light emission port 16. Further, as illustrated in FIG. 1B, the sectional shape of the light tunnel 14 seen from the light incident port 15 or from the light emission port 16 has a square shape. The light tunnel 14 is formed of a reflection base material 18 having a rectangular tubular shape. The reflection base material 18 is formed by providing a reflection film 18b inside a permeable base material 18a such as a glass.

The reflection film 18b of the reflection base material 18 reflects the excitation light LE and fluorescent light LF. The reflection film 18b may be formed of an inductor multi-layered film or of a metal coat such as an aluminium coat. Alternatively, the reflection film 18b may be formed by installing a metal having a high reflectivity.

The both end portions in the longitudinal direction of the light tunnel 14, which is formed of the reflection base material 18 with the rectangular tubular shape, are open to be the light incident port 15 and the light emission port 16. An aspect ratio of the light emission port 16 is similar to an aspect ratio of an irradiated part (e.g., a light modulation element of the image projection apparatus such as a DMD). The irradiation part is irradiated with the illumination light emitted from the illumination device 1.

One of the four inside surfaces of the reflection base material 18 is entirely covered with a phosphor layer 19. Here, the phosphor layer 19 is an example of a wavelength conversion member. That is, the other three surfaces are not covered by the phosphor layer 19 and form reflection surfaces 20 to guide the light to the light emission port 16 while reflecting the light by the reflection film 18b. Note that the surface with the phosphor layer 19 also reflects the fluorescent light LF by the reflection film 18b as the reflection surface 20.

The phosphor layer 19 is excited by the excitation light LE to generate light (fluorescent light LF). The wavelength of the generated fluorescent light LF has been converted by the phosphor layer (wavelength conversion member) 19 so as to have a different wavelength range from that of the excitation light LE. Specifically, it is preferable to use a fluorescent material for the phosphor layer 19 that can convert light having a short optical wavelength and emit the converted light having a long wavelength.

For instance, in case where green color light is emitted as the illumination light, the phosphor layer 19 is formed of the fluorescent material that generates fluorescent light LF including the green wavelength range (e.g., wavelength range of 450 nm to 600 nm). In case where red color light is emitted as the illumination light, the phosphor layer 19 is formed of the fluorescent material that generates fluorescent light LF including the red wavelength range (e.g., wavelength range of 580 nm to 750 nm). In case where yellow color light is emitted as the illumination light, the phosphor layer 19 is formed of the fluorescent material that generates fluorescent light LF including the yellow wavelength range (e.g., wavelength range of 450 nm to 750 nm).

As described above, the fluorescent material for the phosphor layer 19 is appropriately selected in accordance with the illumination light to be emitted from the illumination device 1. Further, as long as the illumination device 1 is configured to convert the excitation light LE and to emit light in a wavelength range different from the excitation light LE, the device may include a wavelength conversion member made from a material other than a phosphor.

The phosphor layer 19 is formed by directly coating one of the inside surfaces of the light tunnel 14 with the fluorescent material. Alternatively, the fluorescent material may be contained in, for example, a binder before coating the inside surface of the light tunnel 14. Alternatively, the base material 18a itself may be made by mixing glass and the fluorescent material instead of coating the surface with the fluorescent material.

Note that the area forming the phosphor layer 19 should not be limited to only one inside surface of the reflection base material 18. That is, the phosphor layers 19 may be formed on two or three surfaces thereof. Further, it is possible to form the phosphor layers 19 on all the four surfaces. However, in order to generate the fluorescent light with high luminous efficiency and to efficiently guide the generated fluorescent light LF to the light emission port 16 while reflecting the light, it is preferable to form the phosphor layer 19 on three or less of the inside surfaces, more particularly to form the phosphor layer 19 on half or less of the inside surfaces (i.e., on one of each two surfaces).

The light incident port 15 of the light tunnel 14 includes the wavelength selection element 21. The wavelength selection element 21 permeates the excitation light LE emitted from the light source 10 and reflects the fluorescent light LF generated by the phosphor layer 19. The wavelength selection element 21 is formed by, for example, vapor-depositing a wavelength selection film 21b onto a base material 21a. Here, the base material 21a of the wavelength selection element 21 is made from glass that permeates the excitation light LE, and the wavelength selection film 21b permeates the excitation light LE and reflects the fluorescent light LF. With this configuration, the excitation light LE transmits the wavelength selection element 21 and enters the light tunnel 14, and the fluorescent light LF is reflected by the wavelength selection element 21 and is guided to the light emission port 16.

In the illumination device 1 of the first embodiment, the excitation light LE emitted from the light source 10 is condensed by the condensing element 11 to be a parallel luminous flux. The excitation light LE, which is the parallel luminous flux, is further condensed by the condensing element 12, transmits the wavelength selection element 21, is guided to the light tunnel 14 in the divergent state, and irradiates the phosphor layer 19 provided on the inside surface of the light tunnel 14.

By guiding the excitation light LE to the light tunnel 14 in the divergent state, the excitation light LE widely irradiates the phosphor layer 19 so as to efficiently generate the fluorescent light LF by the phosphor layer 19. Further, by covering one of the inside surfaces entirely with the phosphor layer 19, the light guided to the reflection surface 20, on which the phosphor layer 19 is not provided, is also guided to the phosphor layer 19 by being reflected by the reflection surface 20. As a result, it improves the wavelength conversion efficiency of the phosphor layer 19 for converting the excitation light LE into the excitation light LE. Here, the wavelength-converted fluorescent light LF is emitted from the light emission port 16 after repeatedly reflected by the reflection surface 20.

Figure 2:
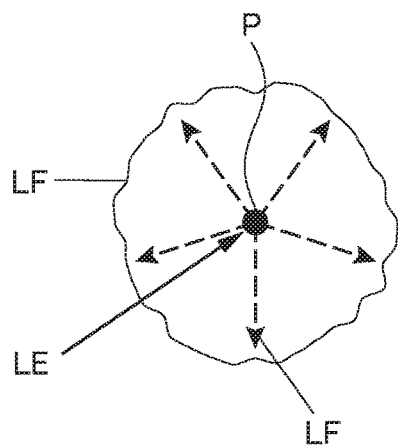
FIG. 2 is a schematic diagram illustrating a state where a fluorescent particle is irradiated with excitation light so as to emit fluorescent light.

FIG. 2 is a schematic diagram illustrating a state where a fluorescent particle P is irradiated with the excitation light LE so as to emit fluorescent light LF. As illustrated in FIG. 2, the fluorescent particle P radiates the fluorescent light LF in the omnidirectional (360°) range when the excitation light LE irradiates the fluorescent particle P. That is, the rectilinearity (i.e., straight advancing property) of the excitation light LE is cancelled by the fluorescent particle P, and the fluorescent particle P functions as a new light source to diffuse and emit the fluorescent light LF.

Similarly, the fluorescent light LF generated by the phosphor layer 19 inside the light tunnel 14 is also diffused in the omnidirectional (360°) range. That is, a part of the fluorescent light LF returns back toward the light incident port 15. However, the fluorescent light LF back toward the light incident port 15 is reflected by the wavelength selection element 21 disposed at the light incident port 15 so as to be guided to the light emission port 16.

Accordingly, the fluorescent light LF emitted in the omnidirection is guided to the light emission port 16 of the light tunnel 14. With this, it is possible to efficiently utilize the fluorescent light LF as the illumination light. Note that the wavelength selector should not to be limited to that of the first embodiment or to the wavelength selection element 21. As long as the wavelength selector selectively extracts the fluorescent light LF advancing back toward the light incident port 15 and guides the extracted fluorescent light LF to the light emission port 16, any configuration for the wavelength selector is applicable.

As described above, the illumination device 1 of the first embodiment widely irradiates the phosphor layer 19 (the wavelength selection member) with the excitation light LE by guiding the excitation light LE to the light tunnel 14 in the divergent state. The fluorescent light LF generated by the phosphor layer 19 is reflected by the reflection surfaces 20 provided on the inside surfaces of the light tunnel 14 and guided to the light emission port 16. Also, the wavelength selection element 21 provided at the light incident port 15 reflects the fluorescent light LF toward the light emission port 16 through the light tunnel 14. Consequently, the illumination device 1 can utilize more fluorescent light LF as the illumination light. This illumination device 1 is suitable to, for example, an image projection apparatus.

Second Embodiment

Figure 3:
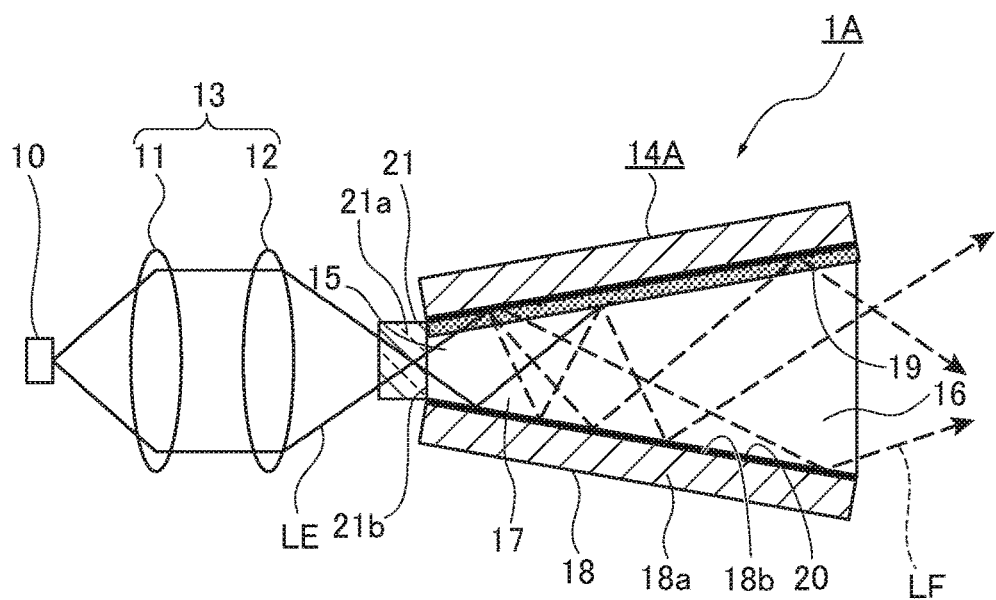
FIG. 3 is an optical diagram illustrating an illumination device according to a second embodiment of this disclosure.

Next, an illumination device according to a second embodiment of this disclosure will be described with reference to FIG. 3. FIG. 3 is an optical diagram illustrating the illumination device 1A of the second embodiment. As illustrated in FIG. 3, the illumination device 1A includes, instead of the light tunnel 14 of the first embodiment, a light tunnel 14A having a tapered shape. The other basic configurations of the illumination device 1A are the same as those of the illumination device 1 of the first embodiment. Hence, the same components are indicated by the same reference signs and detailed explanations thereof are omitted.

The light tunnel 14 of the first embodiment has the rectangular tubular shape and the diameter of the light tunnel 14 is constant from the light incident port 15 to the light emission port 16. The light tunnel 14A of the second embodiment, on the other hand, has the smallest diameter at the light incident port 15 and the diameter is gradually increased toward the light emission port 16. That is, the light tunnel 14A has a tapered shape and has the largest diameter at the light emission port 16. Apart from this, the light tunnel 14A has the same configuration as the light tunnel 14 of the first embodiment, i.e., one of the four inside surfaces of the light tunnel 14A is entirely covered with the phosphor layer 19.

The illumination device 1A of the second embodiment utilizes more fluorescent light as illumination light, by the action similar to that of the illumination device 1 of the first embodiment. That is, it is possible to provide an illumination device more suitable to an image projection apparatus. Besides, by forming the light tunnel 14A in the tapered shape, the illumination device 1A of the second embodiment adjusts reflection angles of the fluorescent light LF, which is diverged in the omnidirectional (360°) range, inside the light guide path 17 so as to guide the fluorescent light LF toward the light emission port 16. Further, angle characteristics of the fluorescent light LF are uniformalized before emitting the fluorescent light LF from the light emission port 16 as the illumination light. Consequently, it is possible to provide the illumination device 1A that is brighter and achieves a better optical performance than that of the illumination device 1.

Note that the light tunnel 14A may be configured to be a tapered shape having the largest diameter at the light incident port 15 and the smallest diameter at the light emission port 16. In this case, since the diameter at the light incident port 15 is large, the excitation light LE enters the light tunnel 14A in a further divergent state. As a result, the excitation light LE is more widely irradiated onto the phosphor layer 19.

Third Embodiment

Figure 4:
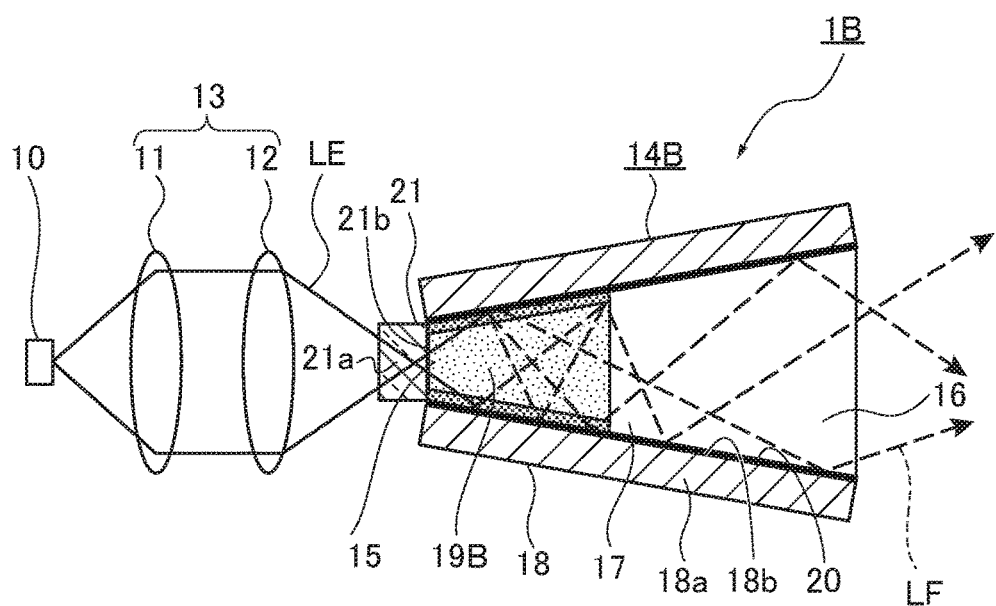
FIG. 4 is an optical diagram illustrating an illumination device according to a third embodiment of this disclosure.

Next, an illumination device according to a third embodiment of this disclosure will be described with reference to FIG. 4. FIG. 4 is an optical diagram illustrating the illumination device 1B according to the third embodiment. The illumination device 1B is a variation of the illumination device 1A of the second embodiment, which includes the taper-shaped light tunnel 14A. The illumination device 1B of the third embodiment includes a light tunnel 14B including a phosphor layer 19B having a different configuration from the phosphor layer 19. The other configurations of the illumination device 1B are the same as those of the illumination device 1A of the second embodiment. Hence, the following explanation is made by focusing on the different configurations.

In the second embodiment, one of the four inside surfaces of the light tunnel 14A is entirely covered by the phosphor layer 19. Alternatively, in the third embodiment, half of the light tunnel 14B, i.e., all four inside surfaces on the side of the light incident port 15, is coated by fluorescent materials to form the phosphor layer 19B, as illustrated in FIG. 4.

As described above, the illumination device 1B of the third embodiment utilizes more fluorescent light as illumination light, by the action similar to that of the illumination device 1 of the first embodiment. That is, it is possible to provide an illumination device more suitable to an image projection apparatus. In general, although most of the fluorescent light LF is regularly reflected by the phosphor layer 19B, a part of them is diffused by a fluorescent particle. That is, it causes a reflection loss of the fluorescent light LF. However, by providing the phosphor layer 19B on all the four inside surfaces of the light tunnel 14A on the side of the light incident port 15, wavelength-converted fluorescent light LF reenters the phosphor layer 19B. As a result, the illumination device 1B of the third embodiment avoids the reflection loss of the fluorescent light LF and efficiently guides the fluorescent light LF to a light emission port 16. Therefore, it is possible to provide the illumination device 1B that is brighter than that of the illumination device 1.

Fourth Embodiment

Figure 5:
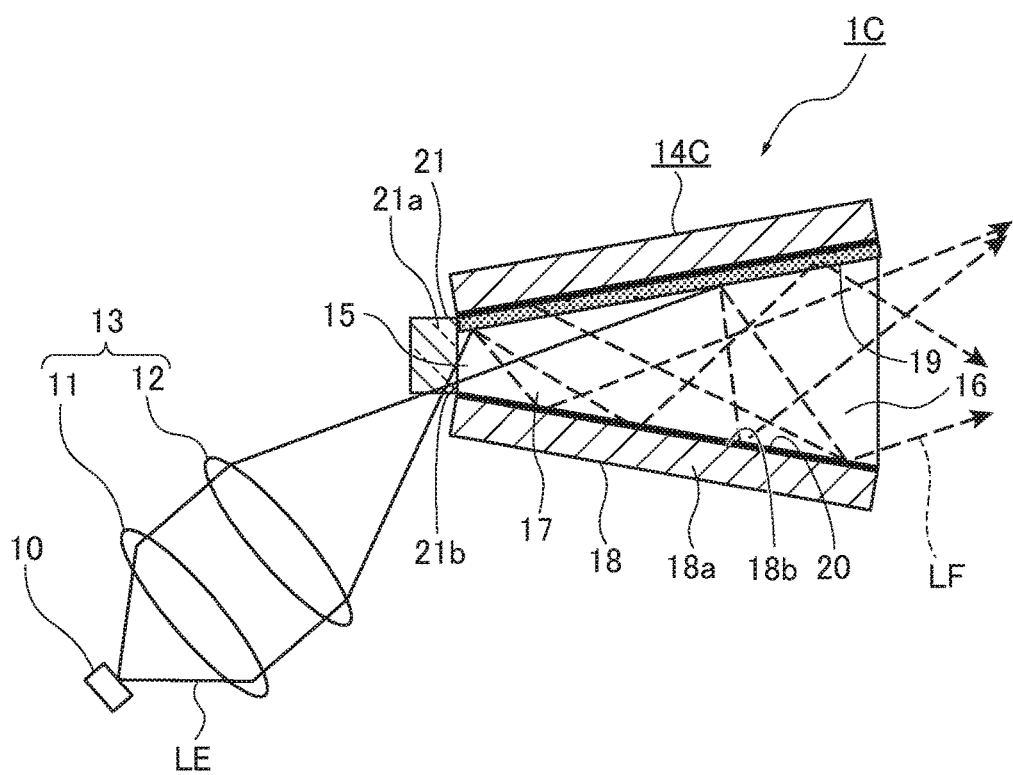
FIG. 5 is an optical diagram illustrating an illumination device according to a fourth embodiment of this disclosure.

Next, an illumination device according to a fourth embodiment of this disclosure will be described with reference to FIG. 5. FIG. 5 is an optical diagram illustrating the illumination device 1C according to the fourth embodiment. As illustrated in FIG. 5, the illumination device 1C includes a light source 10, a condensing optical system 13 having condensing elements 11 and 12, a light tunnel 14C, and a wavelength selection element 21.

The light tunnel 14C of the fourth embodiment has a similar configuration to that of the light tunnel 14A of the second embodiment. However, in the fourth embodiment, excitation light LE is obliquely incident into the light tunnel 14C with respect to the center axis of the light tunnel 14C.

In the first to third embodiments, the excitation light LE is incident into the light tunnel 14, 14A, or 14B in the direction substantially parallel to the center axis of the light tunnel. That is, the excitation light LE is incident in the direction along the light emission direction from a light emission port 16. Hence, the light passing near the optical axis may directly reach the light emission port 16 without being irradiated to a phosphor layer 19 or being reflected inside the light tunnel 14C.

However, in the fourth embodiment, the excitation light LE is obliquely incident into the light tunnel 14C through a light incident port 15. Specifically, the excitation light LE is obliquely incident toward the phosphor layer 19 from a side on which no phosphor layer 19 is provided, and is reflected by the phosphor layer 19. Accordingly, as illustrated in FIG. 5, the light source 10 and the condensing optical system 13 having the condensing elements 11 and 12 are disposed at the side on which no phosphor layer 19 is provided, such that the optical axis of the light source 10 and the condensing optical system 13 is obliquely arranged with respect to the center axis of the light tunnel 14C (i.e., the optical axis is obliquely arranged with respect to the light emission direction from the light emission port 16).

With the above configuration, the excitation light LE emitted from the light source 10 is condensed at the light incident port 15 by the condensing optical system 13 and is guided to the phosphor layer 19 in a divergent state to irradiate the phosphor layer 19. Accordingly, the illumination device 1C of the fourth embodiment decreases the excitation light LE that directly reaches the light emission port 16.

As described above, the illumination device 1C of the fourth embodiment utilizes more fluorescent light as illumination light, by the action similar to that of the illumination device 1 of the first embodiment. That is, it is possible to provide an illumination device more suitable to an image projection apparatus. Besides, by obliquely incident the excitation light LE with respect to the center axis of the light tunnel 14C and guiding the excitation light LE to the phosphor layer 19, the phosphor layer 19 is irradiated with the whole excitation light LE. As a result, it improves the wavelength conversion efficiency and utilizes more fluorescent light LF efficiently. Therefore, it is possible to provide the illumination device 1C that is brighter than that of the illumination device 1.

In the fourth embodiment, the excitation light LE is directly guided to the phosphor layer 19 so as to efficiently convert the wavelength of the excitation light LE into the fluorescent light LF. That is, as long as the phosphor layer 19 is provided at an area where the excitation light LE is directly irradiated, the area of the phosphor layer 19 in the axial direction may be reduced to reduce the phosphor material.

Fifth Embodiment

Figure 6:
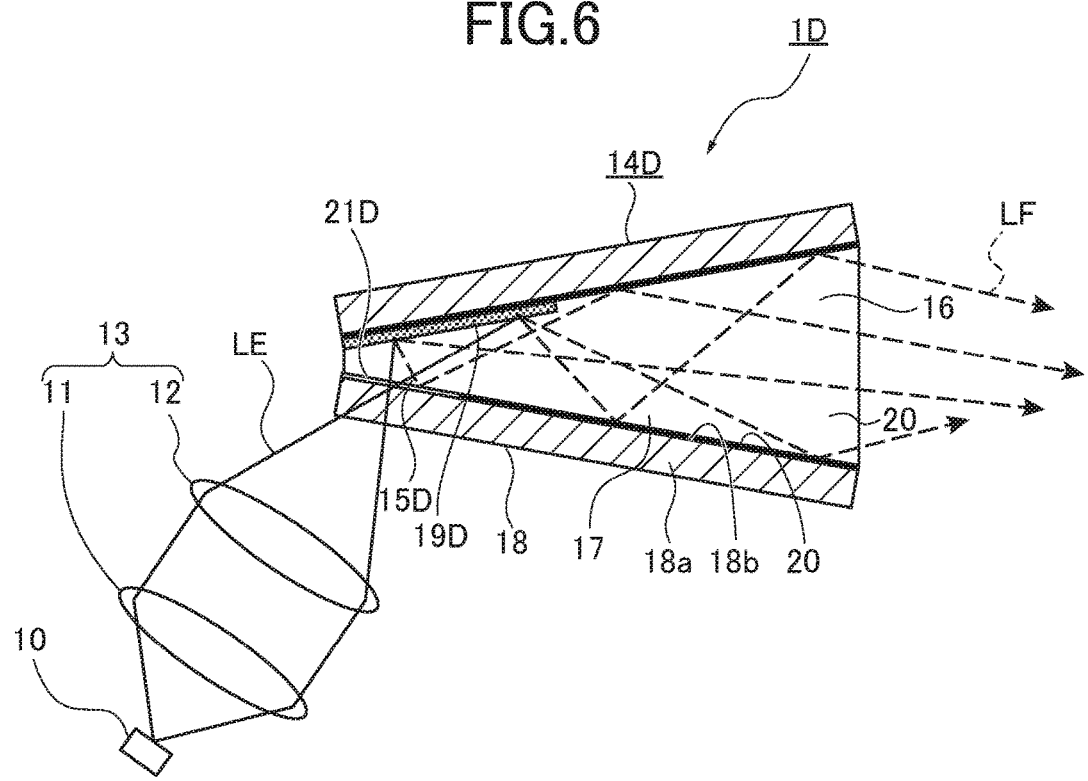
FIG. 6 is an optical diagram illustrating an illumination device according to a fifth embodiment of this disclosure.

Next, an illumination device according to a fifth embodiment of this disclosure will be described with reference to FIG. 6. FIG. 6 is an optical diagram illustrating the illumination device 1D according to the fifth embodiment. As illustrated in FIG. 6, the illumination device 1D includes a light source 10, a condensing optical system 13 having condensing elements 11 and 12, a light tunnel 14D having a tapered shape, and a wavelength selection film 21D as a wavelength selection element (i.e., wavelength selector).

In the first to fourth embodiments, the light incident port 15 is provided at the end of the light tunnels 14, 14A to 14C on the light incident side. In the fifth embodiment, however, a light incident port 15D is provided at a position in the vicinity of one end of the light tunnel 14D on the light incident side and the position facing a phosphor layer 19D, as illustrated in FIG. 6. In other words, the light incident port 15D is provided on a side surface of the reflection base material 18 of the light tunnel 14D. The light tunnel 14D is formed of a base material 18a that permeates the excitation light LE, and a part of the inside surface of the base material 18a facing the phosphor layer 19D is not covered by the reflection film 18b. Further, the light incident port 15D is provided at this part to allow the excitation light LE to enter the light tunnel 14D.

Further, the illumination device 1D of the fifth embodiment includes, instead of the wavelength selection element 21 having the base material 21a and the wavelength selection film 21b, a wavelength selection film 21D as the wavelength selection element. The wavelength selection film 21D is disposed at the area where the light incident port 15 is provided (i.e., inside surface of the base material 18a of the light tunnel 14D). The excitation light LE enters the light tunnel 14D through the light incident port 15D, and fluorescent light LF generated at the phosphor layer 19D advances to the wavelength selection film 21D and is reflected by the wavelength selection film 21D toward a light emission port 16 of the light tunnel 14D.

In the fifth embodiment, a light source 10 and a condensing optical system 13 having condensing elements 11 and 12 are disposed corresponding to the light incident port 15D provided at the side surface of the light tunnel 14D. As illustrated in FIG. 6, the excitation light LE is obliquely incident into the light tunnel 14D with respect to the light emission direction (i.e., obliquely incident into the light tunnel 14D with respect to the center axis of the light tunnel 14D) such that the optical axis of the excitation light LE is perpendicularly cross with the light incident port 15D.

With the above configuration, the illumination device 1D of the fifth embodiment directly guides more excitation light LE to the phosphor layer 19D and, therefore, generates the fluorescent light LF efficiently. Further, the excitation light LE is incident into the phosphor layer 19D with a greater incident angle than that in the fourth embodiment. That is, it is possible to make the area of the phosphor layer 19D in the axial direction small compared to that of the fourth embodiment.

Accordingly, the phosphor layer 19D of the fifth embodiment is not entirely provided on the inside surface of the light tunnel 14D but is only provided on the part of the inside surface where an irradiation area of the diverging excitation light LE is included. Here, the other inside surfaces are covered by the reflection film 18b to reflect the excitation light LE and fluorescent light. That is, the other inside surfaces form the reflection surface 20.

Note that an end part of the light tunnel 14D on the light incident side may be closed, and the inside surface of the end part may be covered by the reflection film 18b. With this, the fluorescent light LF advancing to the end part is reflected and guided to the light emission port 16.

As described above, the illumination device 1D of the fifth embodiment utilizes more fluorescent light as illumination light, by the action similar to that of the illumination device 1 of the first embodiment. Additionally, the illumination device 1D irradiates the phosphor layer 19 with the whole excitation light LE, resulting in improving the efficiency of the wavelength conversion into the fluorescent light LF. Therefore, it is possible to provide an illumination device more suitable to an image projection apparatus. Besides, the wavelength selection film 21D is provided onto the base material 18a of the light tunnel 14D by, for example, vapor-depositing. As a result, it reduces the number of parts and mounting hour for the illumination device 1D. Additionally, it minimizes the usage of the fluorescent material on the phosphor layer 19D.

Sixth Embodiment

Figure 7:
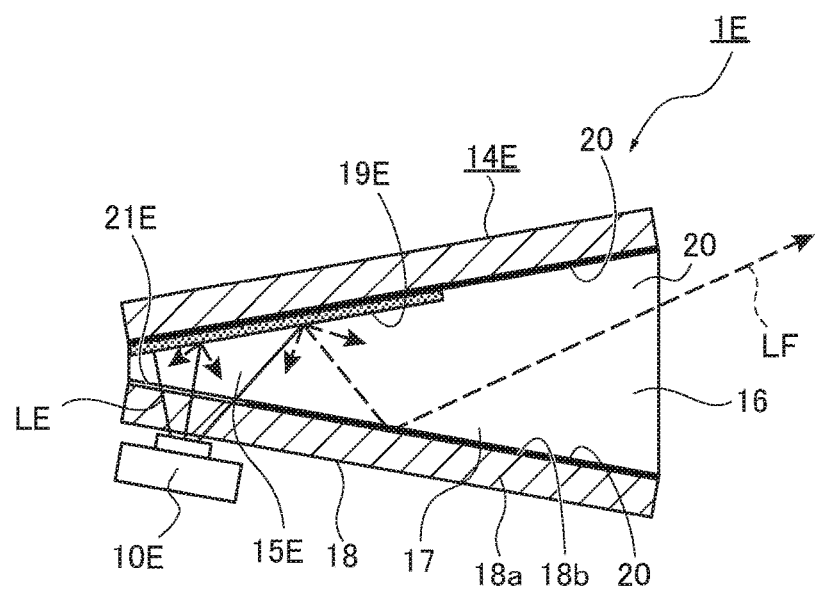
FIG. 7 is an optical diagram illustrating an illumination device according to a sixth embodiment of this disclosure.

Next, an illumination device according to a sixth embodiment of this disclosure will be described with reference to FIG. 7. FIG. 7 is an optical diagram illustrating the illumination device 1E according to the sixth embodiment. The illumination device 1E is a variation of the illumination device 1D of the fifth embodiment, and is configured to directly dispose a light source 10E (e.g., an LED), which emits diverging excitation light LE, at the light incident port 15E without including a condensing optical system 13.

In the sixth embodiment, a light incident port 15E is provided at a side surface of a taper-shaped light tunnel 14E, and a wavelength selection film 21E is provided at a position on a base material 18a where the light incident port 15E is provided. The wavelength selection film 21E permeates the excitation light LE and reflects fluorescent light LF. The light source 10E is disposed in the vicinity of the light incident port 15E so as to obliquely enter the excitation light LE with respect to the light emission direction of a light emission port 16 (i.e., obliquely enter the excitation light LE with respect to the center axis of the light tunnel 14E).

The illumination device 1E includes a phosphor layer 19E in the irradiation area of the excitation light LE. The excitation light LE emitted from the light source 10E in the sixth embodiment is more widely incident into the light tunnel 14E in a further divergent state. That is, the irradiation area becomes wider. Hence, a phosphor layer 19E of the sixth embodiment is larger than that of the forth embodiment. Inside surfaces except for the area having the light incident port 15E are covered by the reflection film 18b to reflect the excitation light LE and fluorescent light LF. That is, the other inside surfaces form the reflection surface 20.

With the above configuration, the excitation light LE emitted from the light source 10E directly enters the light tunnel 14E through the light incident port 15E in the divergent state. That is, the light source 10E functions as a light incident part that allows the excitation light LE to enter the light tunnel 14E in the divergent state. The diverging excitation light LE then advances to the phosphor layer 19E. As a result, more excitation light LE is directly guided to the phosphor layer 19E, thereby irradiating the wider irradiating area on the phosphor layer 19E with the excitation light LE.

As described above, the illumination device 1E of the sixth embodiment utilizes more fluorescent light as illumination light, by the action similar to that of the illumination device 1 of the first embodiment. Additionally, the illumination device 1E irradiates the phosphor layer 19E with the whole excitation light LE, resulting in improving the wavelength conversion efficiency. Therefore, it is possible to provide an illumination device more suitable to an image projection apparatus. Further, the illumination device 1E does not need an optical system to guide the excitation light LE emitted from the light source 10E to the light incident port 15E. As a result, it reduces an efficiency loss, and therefore, provides the illumination device 1E having high efficiency.

Note that the illumination device 1E of the sixth embodiment may include a plate-like diffraction grating between the light source 10E and light incident port 15E so as to improve a directivity of the diverging excitation light LE. With this, it is possible to irradiate the phosphor layer 19E with the excitation light LE more efficiently.

Further, the light tunnel 14E may be configured to cover the entire inside surfaces of the base material 18a, which permeates the excitation light LE, with the wavelength selection film 21E. Here, the wavelength selection film 21E permeates the excitation light LE and reflects the fluorescent light LF. With this configuration, the illumination device 1E reflects only the fluorescent light LF to efficiently guide the reflected light to the light emission port 16 while preventing the excitation light LE from being emitted through the light emission port 16.

Seventh Embodiment

Figure 8:
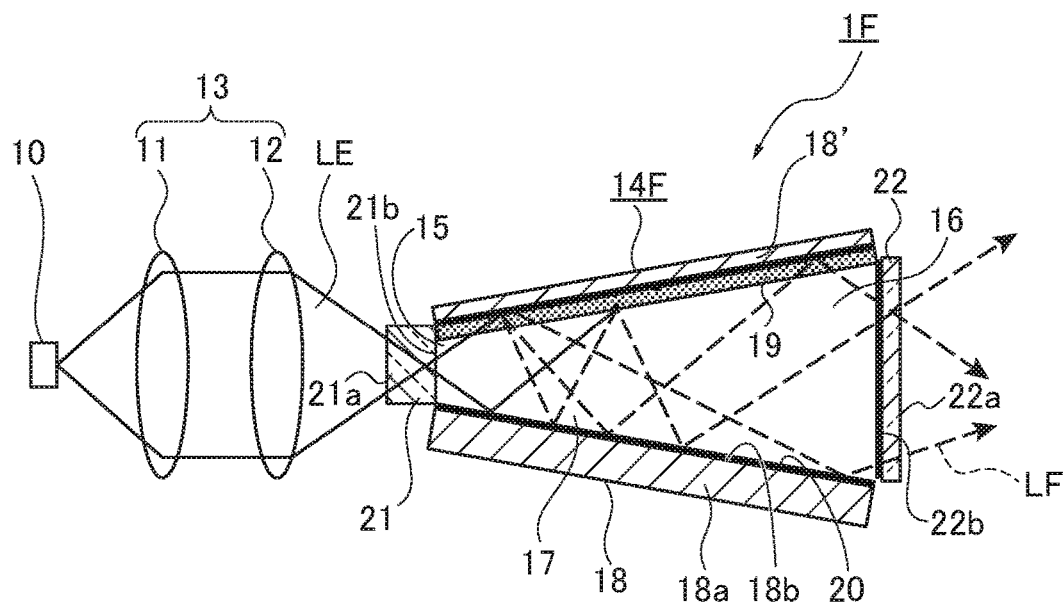
FIG. 8 is an optical diagram illustrating an illumination device according to a seventh embodiment of this disclosure.

Next, an illumination device according to a seventh embodiment of this disclosure will be described with reference to FIG. 8. FIG. 8 is an optical diagram illustrating the illumination device 1F according to the seventh embodiment. The illumination device 1F has a similar configuration to that of the illumination device 1A of the second embodiment. Additionally, the illumination device 1F includes, as illustrated in FIG. 8, a second wavelength selection element (wavelength selector) 22 at a light emission port 16 of a light tunnel 14F. Further, in the seventh embodiment, the surface of the light tunnel 14F having a phosphor layer 19 is formed of a reflection base material 18'. The reflection base material 18' has a high reflectivity and is formed of a metal such as aluminum (Al). Note that the inside surface of the metal-reflection base material 18' functions as a reflection surface 20 and efficiently guides fluorescent light LF generated by the phosphor layer 19 to the light emission port 16. The three other surfaces, on which the reflection base material 18' does not cover, are formed of a reflection base material 18 having a reflection film 18b on a base material 18a made of, for example, glass.

The second wavelength selection element 22 is made of a member having a wavelength selection film 22b on a base material 22a. Here, the base material 22a is made of glass or the like. The wavelength selection film 22b reflects excitation light LE and permeates the fluorescent light LF. By including the second wavelength selection element 22, the illumination device 1F allows the fluorescent light LF to be emitted from the light emission port 16 but reflects the excitation light LE to the inside of the light tunnel 14F.

Some light emitted from the light emission port 16 is reflected inside the light tunnel 14F but not been wavelength-converted in the light tunnel 14F. Besides, some excitation light LE incident through the light incident port 15 is not reflected inside the light tunnel 14F and reaches the light emission port 16 directly. This excitation light LE has no influence on the wavelength conversion, but has influence on the purity of the wavelength of the wavelength-converted fluorescent light LF.

Accordingly, the illumination device 1F of the seventh embodiment includes the second wavelength selection element 22 at the light emission port 16 to return such excitation light LE to the inside of the light tunnel 14F. As a result, it is possible to utilize such excitation light LE as the excitation light LE again.

As described above, the illumination device 1F of the seventh embodiment utilizes more fluorescent light as illumination light, by the action similar to that of the illumination device 1 of the first embodiment. That is, it is possible to provide an illumination device more suitable to an image projection apparatus. Besides, in the seventh embodiment, the fluorescent light LF is efficiently reflected and guided to the light emission port 16. Further, the excitation light LE reached the light emission port 16 is reflected back to the inside of the light tunnel 14F by the second wavelength selection element 22 disposed at the light emission port 16. Therefore, the reflected light is utilized as the excitation light LE again. Consequently, it is possible to achieve the illumination device 1F having a high wavelength conversion efficiency.

Eighth Embodiment

Figure 9:
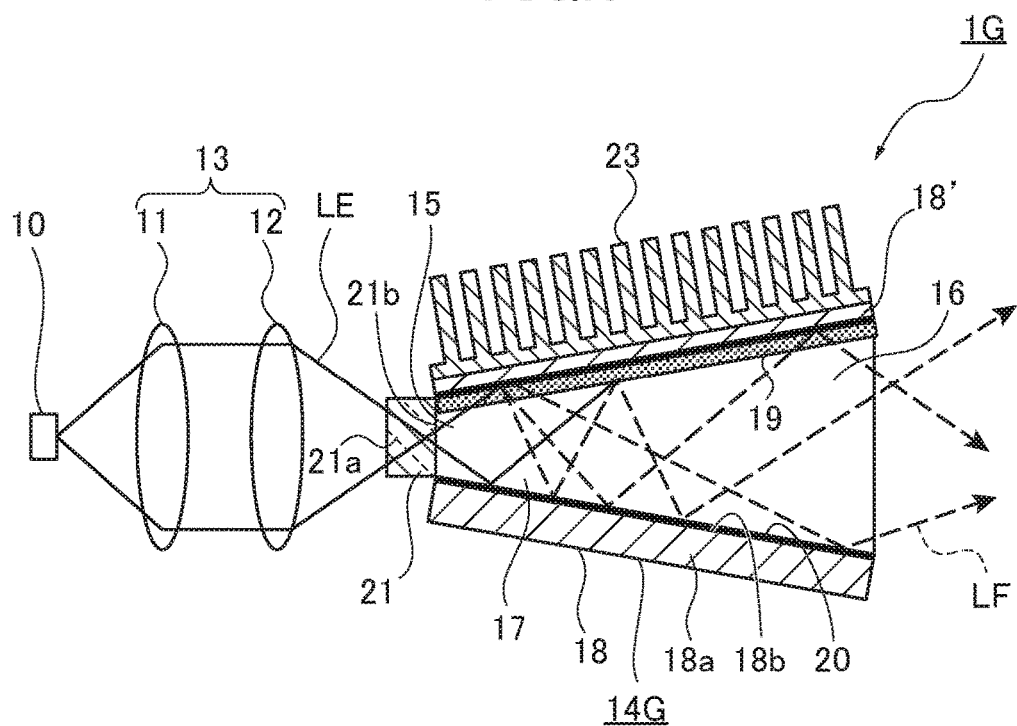
FIG. 9 is an optical diagram illustrating an illumination device according to an eighth embodiment of this disclosure.

Next, an illumination device according to an eighth embodiment of this disclosure will be described with reference to FIG. 9. FIG. 9 is an optical diagram illustrating the illumination device 1G according to the eighth embodiment. As illustrated in FIG. 9, the illumination device 1G includes a light source 10, a condensing optical system 13 having condensing elements 11 and 12, a taper-shaped light tunnel 14G, a wavelength selection element 21, and a heat sink 23. The heat sink 23 is an example of a heat radiation structure. The light tunnel 14G includes a light incident port 15, a light emission port 16, a light guide path 17, a phosphor layer 19, and a reflection surface 20. The surface of the light tunnel 14G having the phosphor layer 19 is formed of a reflection base material 18'. The reflection base material 18' has a high reflectivity and is formed of a metal such as aluminum (Al).

The heat sink 23 is disposed on an outside surface of a reflection base material 18 of the light tunnel 14G. Specifically, the heat sink 23 is disposed on the opposite surface of the surface having the phosphor layer 19. The heat sink 23 may be a conventionally known one. For instance, the heat sink 23 may be an aluminum heat sink, which is light and has excellent heat radiation. In the eighth embodiment, the thickness of the wall having the phosphor layer 19 and heat sink 23 is formed thin. With this, it improves heat conduction from the reflection base material 18 to the heat sink 23 and reduces the size of the light tunnel 14G having the heat sink 23.

In the light tunnel 14G, the other three surfaces without the phosphor layer 19 may be formed of the reflection base material 18 having high thermal conductivity. Note that the base material 18 having high thermal conductivity may be a conventionally known one. For instance, the base material 18 is formed by covering a base material 18a with a reflection film 18b. Here, the base material 18a is formed by mixing glass and metal.

In the embodiments of this disclosure, the phosphor layer 19 is exemplarily used as the wavelength conversion material. As is known, the quantum efficiency of the phosphor is about 70% to 80%, and the non-converted energy generates heat. The generated heat increases the temperature of the phosphor and may deteriorate the conversion efficiency of the phosphor.

In order to overcome such a deficiency, the illumination device 1G of the eighth embodiment includes the heat sink 23. As a result, the heat generated by the phosphor of the phosphor layer 19 is transferred to the base material 18a' having the high thermal conductivity and is efficiently radiated through the heat sink 23. Therefore, it suppresses an increase of temperature of the phosphor layer 19.

As described above, the illumination device 1G of the eighth embodiment utilizes more fluorescent light as illumination light, by the action similar to that of the illumination device 1 of the first embodiment. That is, it is possible to provide an illumination device more suitable to an image projection apparatus. Besides, in the eighth embodiment, by including the base materials 18, 18' and the heat sink 23, the illumination device 1G suppresses a temperature increase of the phosphor and achieves a stable wavelength conversion with the phosphor layer 19. Consequently, it is possible to provide the reliable illumination device 1G that hardly causes a decrease of brightness even with a continuous lighting.

In the above described embodiments, light tunnels are exemplarily used as the light guide member. However, the light guide member of this disclosure should not be limited to the above described light tunnels. For instance, the light tunnel may be made from a transparent medium having a columnar shape. Alternatively, the glass containing phosphor may be used as the light tunnel.

Ninth Embodiment

Figure 10:
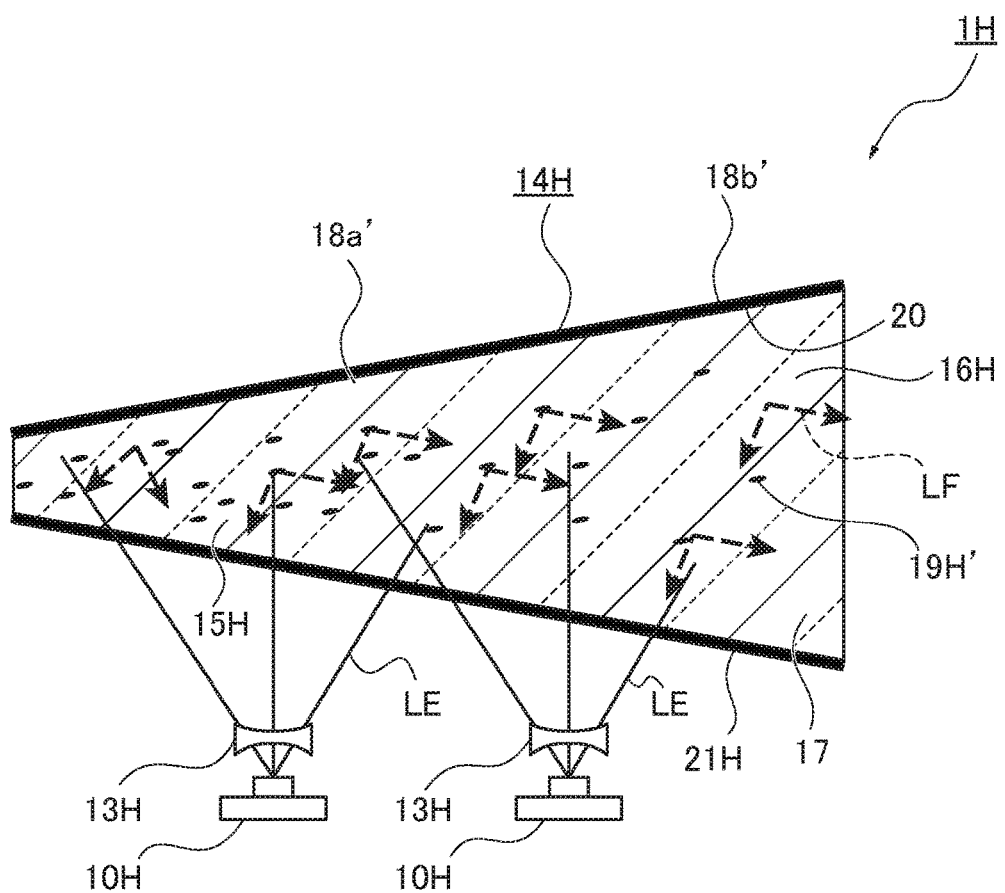
FIG. 10 is an optical diagram illustrating an illumination device according to a ninth embodiment of this disclosure.

Next, an illumination device according to a ninth embodiment of this disclosure will be described with reference to FIG. 10. FIG. 10 is an optical diagram illustrating the illumination device 1H according to the ninth embodiment. As illustrated in FIG. 10, the illumination device 1H includes two light sources 10H, light diffusion members (e.g., concave lenses) 13H respectively disposed on the optical paths of the corresponding light sources 10H, and a taper-shaped light tunnel 14H. Note that the light diffusion members 13H should not be limited to concave lenses. For instance, the light diffusion members 13H may be convex lenses. In this case, diverging light is condensed by the convex lenses. Further, as long as the light diffusion members 13H can diffuse the light emitted from the light sources 10H, any member can be used as the light diffusion member, i.e., it does not have to condense the light.

The light tunnel 14H is formed of a base material 18' containing a phosphor 19H' and has a hexahedron taper-shape structure. The light tunnel 14H at least includes a light incident surface, a reflection surface to reflect fluorescent light LF, and a light emission surface to emit the fluorescent light LF from the light tunnel 14H.

In the ninth embodiment, a color selection filter (wavelength selector) 21H is provided on one of the four inside surfaces (e.g., the bottom surface as illustrated in FIG. 10) of the light tunnel 14H. The color selection film 21H permeates excitation light LE and reflects the fluorescent light LF. The surface provided with the color selection film 21H functions as a light incident port (light incident surface) 15H to which the excitation light LE is incident. The surface (e.g., the upper surface as illustrated in FIG. 10) facing the light incident port (light incident surface) 15H is covered by a reflection layer 18b' to reflect the excitation light LE and fluorescent light LF. That is, this surface functions as a reflection surface 20. The other two side surfaces are also covered by the reflection layer 18b' to be the reflection surface 20. Further, the surface at the back end of the light tunnel 14H (i.e., the surface at the end on the light emission side) is a light emission port (light emission surface) 16H to permeate the fluorescent light LF so as to selectively emit the fluorescent light LF from the light tunnel 14H.

The two light sources 10H are disposed on the side surface of the light tunnel 14H so as to face the light incident ports 15H. The light sources 10H may be LEDs that emit blue excitation light LE or may be semiconductor light sources such as LDs. Although the illumination device 1H includes the two light sources 10H, the number of light sources 10H should not be limited to two. There may be only one light source, or three or more light sources.

Each of the light diffusion members (incident ports) 13H is disposed between each of the light sources 10H and the corresponding light incident ports 15H. The light diffusion members 13H diffuse the excitation light LE and enters the diffused excitation light into the light tunnel 14H. The light diffusion members 13H spread the excitation light LE emitted from the light sources 10H such that the excitation light LE is uniformly incident into the light tunnel 14H. As a result, the excitation light LE irradiates the phosphor 19H' efficiently.

In the ninth embodiment, the light diffusion members 13H are configured by the concave lenses. However, they should not be limited thereto. For instance, the light diffusion members 13H may be configured by convex lenses to radiate the light after condensing the light, or the light diffusion members 13H may be configured by a member having fine irregularities.

In case where LEDs are used as the light sources 10H, the light diffusion members 13H are not necessary since an LED itself is a diverging light source. Therefore, the light diffusion members 13H should be used in case where LDs are used us the light sources 10H. With this, the efficiency of the light diffusion members 13H is maximized.

The color selection film 21H is made of a dielectric multilayer film and directly formed at the light incident port 15H provided on the base material 18a', and the base material 18a' contains the phosphor 19H'. However, the configuration of the color selection film 21H should not be limited thereto. For instance, transparent base materials each covered by a color selection film 21H may be disposed between each of the light sources 10H and the corresponding light incident ports 15H. In that case, it is preferable to dispose the color selection film 21H so as to be adhered to the base material 18a' of the light tunnel 14H.

When the excitation light LE transmits through the color selection film 21H and enters the light tunnel 14H, the phosphor 19H' contained in the base material 18a' of the light tunnel 14H is excited to emit the fluorescent light LF that is wavelength-converted in a wavelength range different from that of the excitation light LE. In the ninth embodiment, the phosphor 19H' emits the fluorescent light LF having the wavelength range of the green color component and red color component. However, it is more preferable to use a yellow phosphor 19H' since the yellow phosphor 19H' has high conversion efficiency and high luminance. In particular, a Yttrium Aluminum Garnet (YAG) single-crystal yellow phosphor is preferable since the YAG single-crystal phosphor has high thermal resistance. That is, when the YAG single-crystal phosphor is irradiated with the excitation light LE, the YAG single-crystal phosphor hardly generate heat. Therefore, the conversion efficiency of the YAG single-crystal phosphor is hardly deteriorated.

As an example of the light tunnel 14H including the phosphor 19H', the base material 18a' is formed by processing the YAG single-crystal phosphor into the tapered shape (a truncated pyramid) or the like. In another example, the light tunnel 14H may be formed by containing the phosphor 19H' in glass. Inside the glass, the excitation light LE is wavelength-converted by the phosphor 19H'.

Some of the fluorescent light LF generated by the phosphor 19H' is directly guided to the light emission port 16 and is output from the light emission port 16H. Other of the fluorescent light LF passes through the light guide path 17 while being reflected by the reflection layer 18b' (reflection surface 20), and is output from the light emission port 16H.

In the above embodiments, the reflection layers 18b' are provided on the surface facing the light incident port (light incident surface) 15H and on the side surfaces. However, it is only an example. It is possible to provide the reflection layer 18' on only one of these surfaces. Further, the shape of the light tunnel 14H should not be limited to a tapered shape. For instance, the shape may be a square pole shape.

Further, similar to the seventh embodiment, the illumination device 1H of the ninth embodiment may further include a second color selection part at the light emission port 16H to reflect the light having the wavelength of the excitation light LE and to permeate the light having the wavelength of the fluorescent light LF. With this, at least a part of excitation light LE that is not converted into the fluorescent light LF is prevented from being emitted outside.

As described above, the illumination device 1H of the ninth embodiment utilizes more fluorescent light as illumination light, by the action similar to that of the illumination device 1 of the first embodiment. That is, it is possible to provide an illumination device more suitable to an image projection apparatus. Besides, in the ninth embodiment, by using the yellow phosphor 19H' that emits the fluorescent light containing red color component and green color component and has a high conversion efficiency, the illumination device 1H emits high luminance illumination light. Particularly, by using the YAG single-crystal yellow phosphor having high thermal resistance, deterioration in the quantum efficiency caused by self-generated heat hardly occurs. As a result, it is possible to provide the high luminance illumination device 1H.

Additionally, the illumination devices 1 to 1H on the above embodiments are suitable to, for example, an image projection apparatus. Accordingly, the sectional shapes of the light tunnels (light guide member) 14 to 14H are set to be the square shape having a similar aspect ratio to that of the light modulation element (a part to be irradiated). However, the sectional shape of the light guide members should not be limited thereto. Depending on the shape of the part to be irradiated, the sectional shape of the light guide members may appropriately be modified so as to efficiently irradiate the part with the illumination light. In case where the phosphor layer is provided in the light guide member (i.e., in the cases of the illumination devices 1 to 1G), it is preferable to provide a wavelength conversion member such as the phosphor layer on quarter of to half of the inside surfaces of the light tunnel from the light incident port to the light emission port in the axial direction. Alternatively, it is preferable to provide a wavelength conversion member on all inside surfaces of the light tunnel on the side of the light incident port.

Tenth Embodiment

Figure 11:
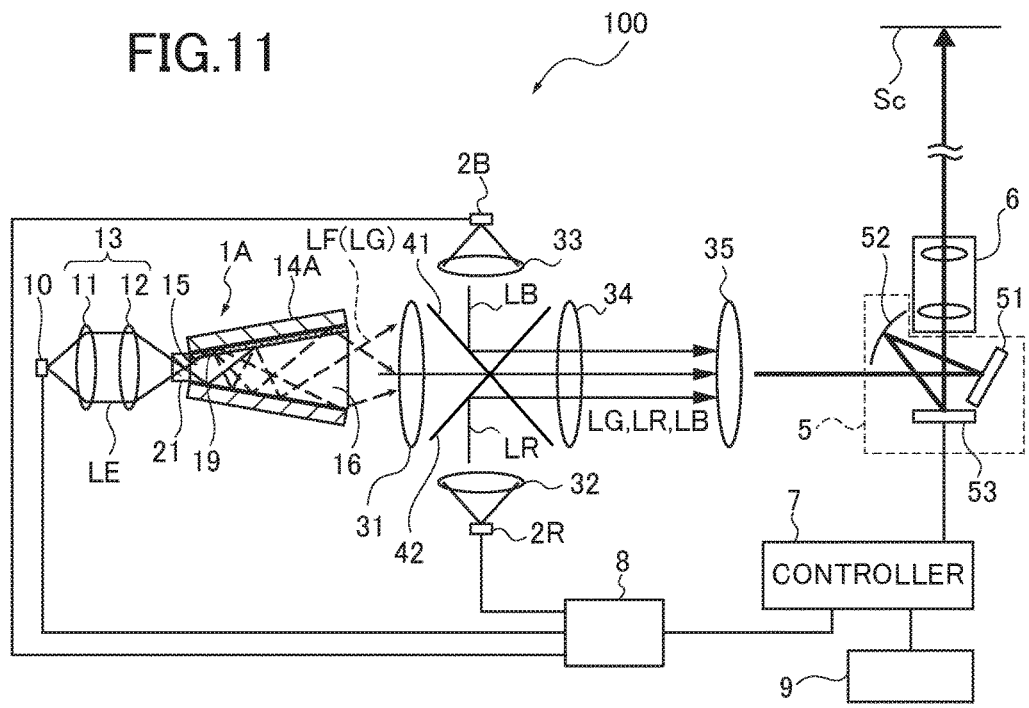
FIG. 11 is an optical diagram illustrating an image projection apparatus (projector) according to a tenth embodiment of this disclosure.

Next, embodiments of an image projection apparatus including the above-explained illumination device will be described. First, an image projection apparatus according to a tenth embodiment will be described with reference to FIG. 11. FIG. 11 is an optical diagram illustrating a projector 100 representing the image projection apparatus of the tenth embodiment.

As illustrated in FIG. 11, the projector 100 of the tenth embodiment includes an illumination device 1A, a red light source 2R used as a second light source (an illumination device), a blue light source 2B used as a third light source (an illumination device), condensing elements 31, 32, 33, 34, 35, dichroic mirrors 41, 42, an image generator 5, a projection optical system 6, a controller 7, a lighting driver 8, and the like. Here, the condensing elements 31 to 35 function as a relay optical system. Note the projector 100 is an apparatus to project and display an enlarged image on a screen Sc (projection plane).

In the tenth embodiment, the image projection apparatus 100 includes the illumination device 1A of the second embodiment. However, the illumination device 1A may be replaced with any one of the other illumination devices 1, 1B to 1G of the first, and third to eighth embodiments. In the tenth embodiment, the phosphor layer 19 of the illumination device 1A includes a green fluorescent material. Accordingly, the illumination device 1A of the image projection apparatus 100 emits green illumination light (hereinafter referred to as "green color light LG") from the light emission port 16.

The red light source 2R emits red light (hereinafter called "red color light LR") as illumination light, and the blue light source 2B emits blue light (hereinafter called "blue color light LB") as the illumination light. The red light source 2R and the blue light source 2B may be laser diodes (LD) or LEDs that emit a red laser beam and a blue laser beam respectively. The red light source 2R preferably emits light in the wavelength range of 260 nm to 750 nm. The blue light source 2B preferably emits light in the wavelength range of 400 nm to 470 nm.

Each of the condensing elements 31, 32, 33 respectively condenses the green color light LG, red color light LR, and blue color light LB, and the condensed light enters the dichroic mirrors 41, 42. The dichroic mirror 41 allows the green color light LG to transmit therethrough and reflects the blue color light LB so as to guide these lights to the condensing element 34. The dichroic mirror 42 allows the green color light LG to transmit therethrough and reflects the red color light LR so as to guide these lights to the condensing element 35. The condensing elements 34 and 35 relay and guide the green color light LG, blue color light LB, and red color light LR (i.e., the illumination light) to the image generator 5.

Note that a light tunnel 14A of the second embodiment may be disposed between the condensing element 34 and the condensing element 35 as an illumination light equalizing means to suppress unevenness of the light luminance and to obtain more equalized illumination light.

The image generator 5 utilizes the illumination light, which has been emitted from the illumination device 1A, red light source 2R, and the blue light source 2B and guided by the relay optical system, and forms a full color image based on image generation data. The image generator 5 includes a reflection mirror 51, a concave mirror 52, and a light modulation element 53. The illumination light guided by the relay optical system enters to and is reflected by the reflection mirror 51. The illumination light reflected by the reflection mirror 51 is further reflected by the concave mirror 52. The illumination light reflected by the concave mirror 52 then irradiates the light modulation element 53.

The controller 7 controls the light modulation element 53 to respectively adjust gradations of the green color light LG, red color light LR, and blue color light LB in each pixel and generates a color projection image. In the tenth embodiment, the light modulation element 53 is a Digital Micromirror Device (DMD). However, it should not be limited thereto. For instance, the light modulation element 53 may be a liquid crystal.

The projection optical system 6 projects, on the screen Sc, the projection image generated by the light modulation element 53 of the image generator 5. The projection optical system 6 includes a fixed lens group in a fixed lens-barrel and a movable lens group in a movable lens-barrel. By moving the movable lens group, the projection optical system 6 adjusts a focus and zooming.

The controller 7 integrally controls the operations in the projector 100. The controller 7 is composed of a CPU, a ROM, a RAM, and the like. The controller 7 uses the RAM as a work memory to drive each part (unit) of the projector 100 in accordance with the program preinstalled on the ROM.

Specifically, the controller 7 is connected to the lighting driver 8, the light modulation element 53 of the image generator 5, a driving mechanism to move the movable lens group of the projection optical system 6, and the like. The lighting driver 8 lights up the light source 10 of the illumination device 1A, the red light source 2R, and the blue light source 2B. Accordingly, the controller 7 controls the light sources 2R and 2B to emit the light via the lighting driver 8, controls the light modulation element 53 to generate the projection image via the image generator 5, and controls the focus adjustment and/or zooming adjustment via the projection optical system 6.

The controller 7 is also connected to an external information device such as a personal computer through an interface and acquires image data and the like from an image information storage (memory) 9 of the external information device. The controller 7 executes image processing on the acquired image data and generates image generation data to generate the projection image in the light modulation element 53 of the image generator 5. The controller 7 then generates driving signals to drive the image generator 5 based on the generated image generation data and outputs the driving signals to the image generator 5.

In the projector 100 of the above-explained tenth embodiment, the green color light LG emitted from the light emission port 16 of the illumination device 1A is condensed by the condensing element 31 and is transmitted through the dichroic mirrors 41, 42. The green color light LG is then relayed by the condensing elements 34, 35, reflected by the reflection mirror 51 and concave mirror 52 of the image generator 5, and illuminates the light modulation element 53.

Similarly, the blue color light LB emitted from the blue light source 2B is condensed by the condensing element 33 and reflected by the dichroic mirror 41. The blue color light LB is then relayed by the condensing elements 34, 35 and enters the image generator 5. Further, the blue color light LB is reflected by the reflection mirror 51 and concave mirror 52 and illuminates the light modulation element 53.

The red color light LR emitted from the red light source 2R is condensed by the condensing element 32 and reflected by the dichroic mirror 42. The red color light LR is then relayed by the condensing elements 34, 35 and enters the image generator 5. Further, the red color light LR is reflected by the reflection mirror 51 and concave mirror 52 and illuminates the light modulation element 53.

Lighting timing of each light source 10, 2R, and 2B is determined as below. That is, the controller 7 controls the lighting driver 8 to sequentially switch the green color light LG, red color light LR, and blue color light LB from the illumination device 1A, red light source 2R, and blue light source 2B within one frame period of an image in time-division manner. The controller 7 separately drives micro mirrors of the light modulation element 53 so as to synchronize with the emission timing of each illumination light. With this, the projector 100 sequentially projects the projection image of each color generated based on the image generation data from the projection optical system 6 to the screen Sc. Consequently, the projector 100 generates a full color image based on the image generation data and projects the image on the screen Sc by utilizing an afterimage phenomenon of human eyes.

As described above, by utilizing the illumination devices 1, 1A-1G according to the first to eighth embodiments, the image projection apparatus of the tenth embodiment obtains the illumination light efficiently. That is, it is possible to provide a high luminance projector 100. Specifically, by providing the phosphor layer 19 to generate the green fluorescent light LF as the wavelength conversion member of the illumination device 1A, it becomes possible to provide a higher luminance projector 100 since the green light has high visibility.

Eleventh Embodiment

Figure 12:
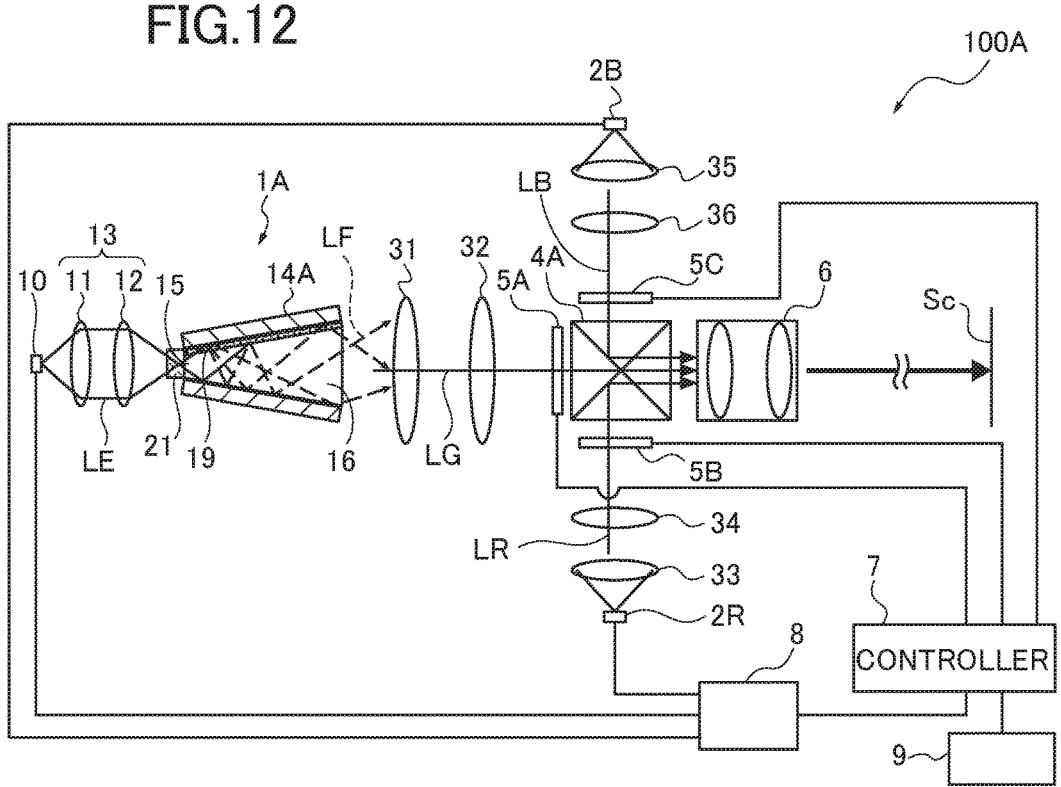
FIG. 12 is an optical diagram illustrating an image projection apparatus (projector) according to an eleventh embodiment of this disclosure.

Next, an embodiment of an image projection apparatus according to an eleventh embodiment of this disclosure will be described with reference to FIG. 12. FIG. 12 is an optical diagram illustrating a projector 100A (an image projection apparatus) according to the eleventh embodiment. The projector 100A includes three liquid crystal panels 5A, 5B, and 5C as an image generator.

As illustrated in FIG. 12, the projector 100A of the eleventh embodiment includes an illumination device 1A (illumination device), a red light source 2R used as a second light source (illumination device), a blue light source 2B used as a third light source (illumination device), condensing elements 31, 32, 33, 34, 35, 36, liquid crystal panels 5A, 5B, 5C, a cross dichroic prism 4A, a projection optical system 6, a controller 7, a lighting driver 8, and the like. Here, the condensing elements 31 to 36 function as a relay optical system, and the liquid crystal panels 5A to 5C function as an image generator.

The controller 7 controls ON and OFF of the liquid crystal panels 5A, 5B, 5C based on image information acquired from an image information storage (memory) 9. The controller 7 also controls the lighting driver 8 to light up the light sources 10, 2R, and 2B in response to the ON and OFF of the liquid crystal panels 5A, 5B, and 5C.

Although the projector 100A of the eleventh embodiment includes the illumination device 1A of the second embodiment, the illumination device 1A may be replaced with any one of the illumination devices 1, and 1B to 1G of the first, and third to eighth embodiments.

In the projector 100A, the green color light LG emitted from the illumination device 1A is relayed by the condensing elements 31, 32, 33 and illuminates the liquid crystal panel 5A. The red color light LR emitted from the red light source 2R is condensed by the condensing elements 33, 34 and illuminates the liquid crystal panel 5B. The blue color light LB emitted from the blue light source 2B is condensed by the condensing elements 35, 36 and illuminates the liquid crystal panel 5C.

Based on the illumination light of each color, each of the liquid crystal panels 5A, 5B, 5C generates a projection image of each color. Each of the projection images is then synthesized by the cross dichroic prism 4A to be a full color image. The synthesized full color image is then enlarged and projected onto the screen Sc by the projection optical system 6.

As described above, by utilizing the illumination devices 1, 1A-1G according to the first to eighth embodiments, the image projection apparatus of the eleventh embodiment obtains the illumination light efficiently. Besides, by providing the phosphor layer 19 to generate the green fluorescent light LF, it becomes possible to provide a higher luminance projector 100A since the green light has high visibility. Note that when the illumination device 1H of the ninth embodiment utilizes a green phosphor for the phosphor 19H', the illumination device 1H can be used for the projectors 100 and 100A of the tenth and eleventh embodiments, thereby obtaining the illumination light efficiency.

Twelfth Embodiment

Figure 13:
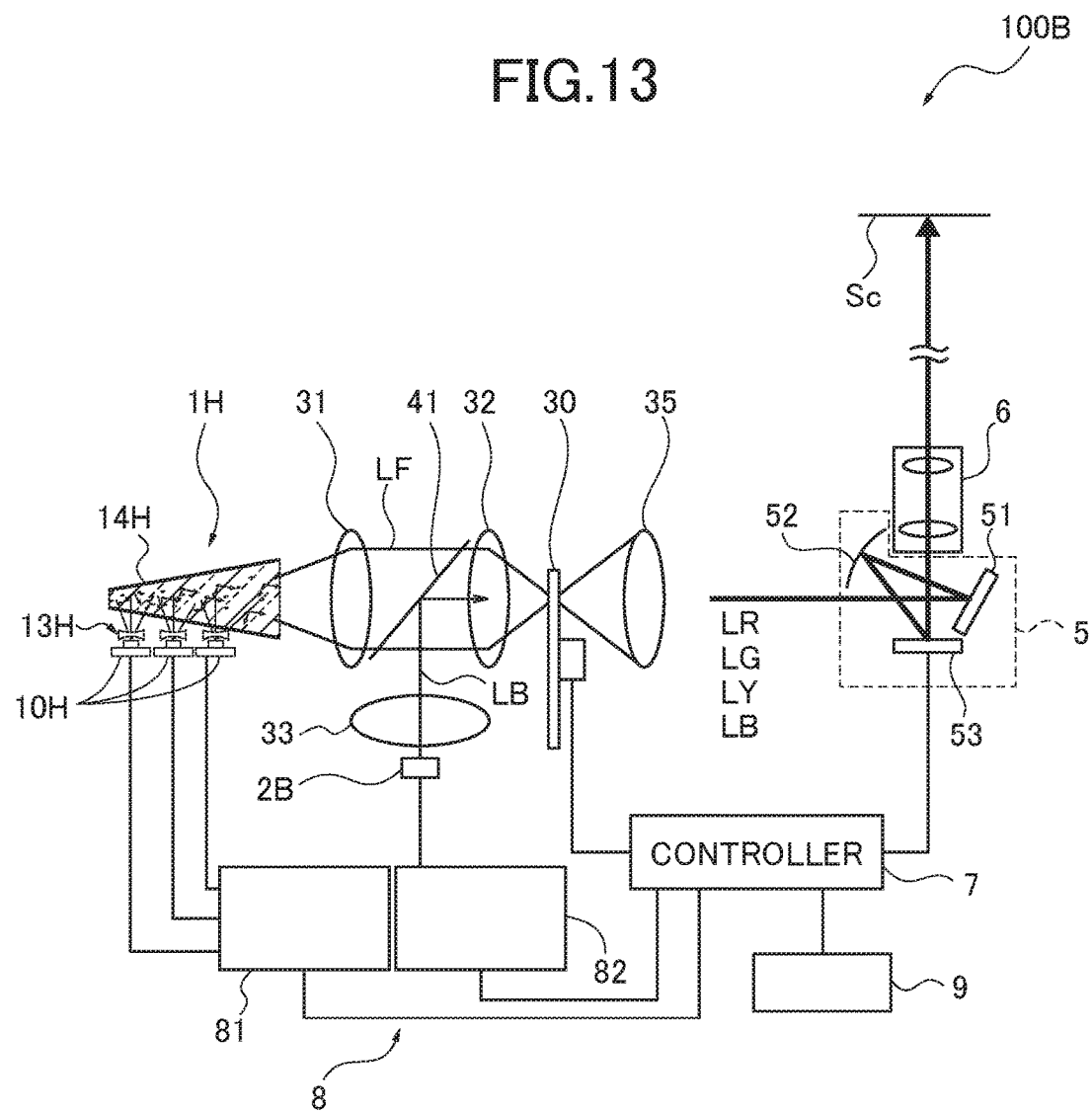
FIG. 13 is an optical diagram illustrating an image projection apparatus (projector) according to a twelfth embodiment of this disclosure.
Figure 14:
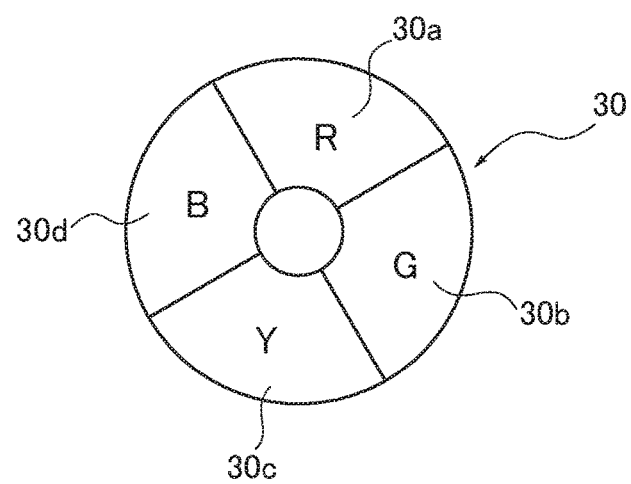
FIG. 14 is a plane view illustrating a color wheel illustrated in FIG. 13.

Next, an embodiment of an image projection apparatus of according to a twelfth embodiment of this disclosure will be described with reference to FIG. 13 and FIG. 14. FIG. 13 is an optical diagram illustrating a projector 100B representing the image projection apparatus of the twelfth embodiment. FIG. 14 is a plane view illustrating a color wheel 30 included in the projector 100B. The color wheel 30 is a light separation member. That is, a characteristic feature of the projector 100B according to the twelfth embodiment is that the illumination device 1H includes the color wheel 30 to separate the illumination light in accordance with the colors.

As illustrated in FIG. 13, the projector 100B of the twelfth embodiment includes the illumination device 1H, a blue light source 2B used as a second light source (illumination device), condensing elements 31, 32, 33, 34, 35, a dichroic mirror 41, the color wheel 30 (wavelength separator), an image generator 5 including a light modulation element 53, a projection optical system 6, a controller 7, and a lighting driver 8. Here, the condensing elements 31 to 35 function as a relay optical system, and the light modulation element 53 functions as a light valve. The lighting driver 8 includes an excitation light driver 81 and a blue light source driver 82.

The projector 100B according to the twelfth embodiment sequentially obtains illumination light from the illumination device 1H with every predetermined time and illuminates a single panel (light modulation element 53) with the obtained illumination light. This single panel (light modulation element 53) forms an image corresponding to red color R, green color G, and blue color B, and the projector 100B enlarges and projects the image formed on the panel onto the screen Sc as the image projection apparatus.

Although the blue light source 2B in this embodiment uses an LED which emits blue laser beam, the blue light source 2B may be an LD.

The color wheel 30 is disposed at a position on the optical path of the fluorescent light LF emitted from the illumination device 1H and the position nearby condensing position of the fluorescent light LF condensed by the condensing element 32. The controller 7 rotates the color wheel 30 so as to switch spectrum permeabilities of the color wheel 30 on the optical path in time-division manner.

The color wheel 30 is composed of a plurality of fan-shaped areas formed of color filters. In the color wheel 30, it is preferable to include at least a first area to mainly permeate the light in the red (R) wavelength range and a second area to mainly permeate the light in the green (G) wavelength range. Further, the color wheel 30 may include a third area to mainly permeate the light in the yellow (Y) wavelength range.

The color wheel 30 of the twelfth embodiment includes a first wavelength separator 30a, a second wavelength separator 30b, a third wavelength separator 30c, and a transparent area 30d. The first wavelength separator 30a corresponds to the first area and permeates the light in the red (R) wavelength range (i.e., permeates the red color light LR). The second wavelength separator 30b corresponds to the second area and permeates the light in the green (G) wavelength range (i.e., permeates the green color light LG). The third wavelength separator 30c corresponds to the third area and permeates the light in the yellow (Y) wavelength range (i.e., permeates the yellow color light LY). When the transparent area 30d is placed on the optical path, the blue color light LB emitted from the blue light source 2B passes through the color wheel 30.

The above described projector 100B obtains the yellow fluorescent light LF from the illumination device 1H. The fluorescent light LF emitted from the emission surface of the illumination device 1H is turned to parallel light by the condensing element 31 and condensed by the condensing element 32 after transmitting through the dichroic mirror 41. The condensed light is then incident to the color wheel 30 disposed near the condensing position. The color wheel 30 is rotated to switch the first, second, and third wavelength separator 30a, 30b, 30c in time-division manner when driving the excitation light driver 81. Accordingly the projector 100B sequentially extracts the red color light LR, green color light LG, and yellow color light LY from the yellow fluorescent light LF.

On the other hand, by driving the other light source (i.e., the blue light source 2B) using the blue light source driver 82, the projector 100B emits the blue color light LB. The blue color light LB is guided to the dichroic mirror 41 through the condensing element 33. Here, the optical path of the blue light source 2B is synthesized with the optical path of the fluorescent light LF, and the blue color light LB is incident to the color wheel 30 through the condensing element 32. At this moment, the transparent area 30d of the color wheel 30 is placed on the optical path to pass the blue color light LB through the color wheel 30. As a result, the projector 100B extracts the blue color light LB.

Namely, the projector 100B extracts at least the red color light LR, green color light LG, and blue color light LB through the condensing element 35 by synthesizing the emission of the excitation light from the light source 10H and the emission from the blue light source 2B with the rotation of the color wheel 30. By including the third wavelength separator 30c to permeate the light in the yellow wavelength range, the projector 100B of this embodiment can sequentially extract each monochromatic light (red color light LR, green color light LG, yellow color light LY, or blue color light LB).

The projector 100B then irradiates the light modulation element 53 such as a DMD with the extracted illumination light to generate an image. The image is then enlarged by the projection optical system 6 and projected to the screen Sc. The controller 7 drives the micro mirrors of the light modulation element 53 based on the input image information while synthesizing the drive operation of the excitation light driver 81 and the blue light source driver 82 with the rotation of the color wheel 30.

Although the projector 100B of the twelfth embodiment includes the illumination device 1H of the ninth embodiment, the illumination device 1H may be replaced with any one of the illumination devices 1, and 1A to 1G of the first to eighth embodiments.

As described above, by utilizing the illumination devices 1, 1A-1H according to the first to ninth embodiments, the image projection apparatus of the twelfth embodiment obtains the illumination light efficiently. That is, it is possible to provide a high luminance projector 100B. Besides, by extracting the red color light LR from the yellow fluorescent light LF using the color wheel 30, it becomes possible to obtain high luminance red illumination light. Additionally, by rotating the color wheel 30 to switch the first, second, and third wavelength separators 30$a$, 30$b$, 30$c$ in time-division manner, it becomes possible to provide the illumination device and projector 100B that can obtain high luminance monochromatic lights.

Although the illumination device and the image projection apparatus of this disclosure have been described in terms of exemplary embodiments, they should not be limited thereto. It should be appreciated that variations or modifications may be made in the embodiments described by persons skilled in the art without departing from the scope of the present invention as defined by the following claims. Besides, the number, positions, and/or shapes of the components may appropriately be modified without being limited to those of the above embodiments. Although the image projection apparatus is exemplarily applied to a projector in the above embodiments, it should not be limited thereto. For instance, the image projection apparatus may be applied to an exposure apparatus to expose circuit patterns on a wafer during a manufacturing process of a semiconductor device.

REFERENCE SIGNS LIST 1, 1A, 1B, 1C, 1D, 1E, 1F, 1G, 1H illumination device
5 Image generator
53 Light modulation element (Light valve)
5A, 5B, 5C Liquid crystal panel (Image generator)
6 Projection optical system
10, 10H Light source
10E Light source (Excitation light source, Incident part)
13 Condensing optical system (Incident part)
13H Light diffusion part (Incident part)
14, 14A, 14B, 14C, 14D, 14E, 14F, 14G, 14H Light tunnel (Light guide member)
15, 15D, 15E Light incident port (Light incident part)
15H Light incident part
16 Light emission port (Light emission part)
16H Light emission part
17 Light guide path
19, 19B, 19D, 19E Phosphor layer (Wavelength conversion member)
19H' Phosphor (Wavelength conversion member)
21 Wavelength selection element (Wavelength selector)
21D, 21E Wavelength selection film (Wavelength selector)
21H Color selection filter (Wavelength selector)
22 Wavelength selection element (Second wavelength selector)
23 Heat sink (Heat radiation structure)
30 Color wheel (Wavelength separator)
100, 100A, 100B Projector

CROSS-REFERENCE TO RELATED APPLICATIONS

The present application is based on and claims priority to Japanese patent applications No. 2015-031828 filed on Feb. 20, 2015 and No. 2015-120888 filed on Jun. 16, 2015, the disclosures of which are hereby incorporated by reference herein in its entirety.

CITATION LIST

Patent Literature

PTL 1: JP 2006-214006 A
PTL 2: JP5510828 B

The invention claimed is:

1. An illumination device, comprising:
a light source to emit light in a wavelength range;
a light incident part, the light emitted from the light source being incident to the light incident part;
a light emission part from which the light is emitted; and
a light guide member including a light guide path extending from the light incident part to the light emission part, wherein
the light guide member is made from a permeable material, and
the light guide member includes a wavelength conversion member to convert the light emitted from the light source in a wavelength range into light having a different wavelength range from the wavelength range of the light emitted from the light source,
a wavelength selector to permeate the light emitted from the light source and to reflect the light once converted, the wavelength selector being provided at the light incident part, the permeable material including a first end surface as the light emission part, a second end surface facing the first end surface, and a plurality of side surfaces connecting the first end surface and the second end surface, the light incident part being at least one of the plurality of side surfaces.

2. The illumination device of claim 1, further comprising a light incident structure at a position between the light source and the light guide member, wherein
the light incident structure is configured to diverge the light emitted from the light source at a position in a vicinity of the light incident structure and is configured to allow the diverged light to enter the light guide member so as to irradiate the wavelength conversion member with the diverged light.

3. The illumination device of claim 1, further comprising a second wavelength selector at the light emission part, wherein
the second wavelength selector is configured to permeate the light once converted and is configured to reflect excitation light.

4. The illumination device of claim 1, wherein, in the light guide member, at least an inside surface of the light guide member provided with the wavelength conversion member is formed of a member having thermal conductivity.

5. The illumination device of claim 1, wherein the light guide member includes a heat radiation structure on an outside surface of the light guide member, opposite to an inside surface of the light guide member, provided with the wavelength conversion member.

6. The illumination device of claim 1, wherein the wavelength conversion member is a phosphor to generate fluorescent light containing green light when excited by excitation light.

7. The illumination device of claim 1, wherein the wavelength conversion member is configured to generate fluorescent light containing at least a red color component and a green color component.

8. The illumination device of claim 7, further comprising a wavelength separator configured to separate the fluorescent light into red illumination light having a red light wavelength range and green illumination light having a green light wavelength range.

9. The illumination device of claim 8, wherein the wavelength separator includes at least two areas, each of the at least two areas representing one of a first wavelength separator and a second wavelength separator, the first wavelength separator being configured to selectively extract the green illumination light, the second wavelength separator being configured to selectively extract the red illumination light, and the first wavelength separator and the second wavelength separator being sequentially switched on an optical path of the fluorescent light.

10. An image projection apparatus, comprising the illumination device of claim 9, a single light valve, configured to be illuminated with at least two color illumination light sequentially obtained by the illumination device and configured to generate an image modulated in response to each color, and a projection optical system configured to project the image once generated.

11. The illumination device of claim 1, wherein the permeable material of the light guide member is glass.

12. The illumination device of claim 11, wherein the light guide member includes a reflection film provided inside the glass.

13. The illumination device of claim 1, wherein the light guide member includes a reflection film provided inside the permeable material.

14. The illumination device of claim 2, wherein the wavelength conversion member is configured to generate fluorescent light containing at least a red color component and a green color component.

15. The illumination device of claim 14, further comprising a wavelength separator configured to separate the fluorescent light into red illumination light having a red light wavelength range and green illumination light having a green light wavelength range.

16. The illumination device of claim 15, wherein the wavelength separator includes at least two areas, each of the at least two areas representing one of a first wavelength separator and a second wavelength separator, the first wavelength separator being configured to selectively extract the green illumination light, the second wavelength separator being configured to selectively extract the red illumination light, and the first wavelength separator and the second wavelength separator being sequentially switched on an optical path of the fluorescent light.

17. An image projection apparatus, comprising the illumination device of claim 16, a single light valve, configured to be illuminated with at least two color illumination light sequentially obtained by the illumination device and configured to generate an image modulated in response to each color, and a projection optical system configured to project the image once generated.

18. The illumination device of claim 2, wherein the permeable material of the light guide member is glass.

19. The illumination device of claim 18, wherein the light guide member includes a reflection film provided inside the glass.

* * * * *